Nov. 19, 1940.   O. M. BURKHARDT   2,222,138
MECHANICAL CLEARANCE REGULATOR
Filed Feb. 28, 1938

INVENTOR.
OTTO M. BURKHARDT.
BY Milburn & Milburn
ATTORNEYS.

Patented Nov. 19, 1940

2,222,138

UNITED STATES PATENT OFFICE 2,222,138

MECHANICAL CLEARANCE REGULATOR

Otto M. Burkhardt, Cleveland, Ohio, assignor to Thompson Products, Inc., Cleveland, Ohio Application February 28, 1938, Serial No. 193,016

6 Claims. (Cl. 123—90)

This invention relates to an automatically adjustable mechanical clearance regulator for internal combustion engines and is related to the device disclosed in my co-pending application, Serial No. 169,642, filed October 18, 1937.

As in the former application, supra, so in the present case, it is emphasized that an automatically adjustable mechanical clearance regulator must not only assure the automatic taking up of slackness due to wear and contraction of the valve linkage, by an increase in the length axially of the regulator, but it must also positively function in the opposite manner so that when the valves become hot and the entire linkage is expanding, the structural length of the clearance regulator will, during a suitable period of each cam shaft revolution, decrease a micrometric amount. This is essential for satisfactory valve action which necessitates that at all times the valve be assured of positive seating.

In an automatically adjustable clearance regulator such as is now under consideration, the axial length decreases a micrometric amount and this decrease is so controlled that, at all times during each revolution of the cam shaft, it is equal to or greater than the expansion of the linkage within which the regulator is located. The decrease in axial length preferably should be more than the valve linkage expansion per revolution so that the valve not only is assured of positive closing but that for the sake of safety a little slackness will have to be taken out by the clearance regulator when the valve is closed. It will be understood that this safety feature is to ensure positive valve closing; and the controllable micrometric adjustment effecting the decrease in length must be so safeguarded that the valve mechanism will not be noisy at any time.

As explained in the companion application, supra, the valve-actuating cams in motors already in use and those now being built, are provided with long ramps to compensate for varying length of and consequently varying clearance within the valve linkage. Now, as a valve clearance regulator does ensure zero clearance for each cam shaft revolution, it is obvious that the clearance regulator in the former application had to be provided with a device, there designated as a fixed clearance element, which would provide as much clearance as was designed in the ramp of each cam lobe. Without such fixed clearance element, clearance regulators when used with cams having long ramps on them, would cause the timing to be unduly long and hence objectionable.

In the present case, I have devised a form of automatic mechanical clearance regulator that is especially adapted for motors in which the lobes of the cam shaft do not have the above-mentioned long ramps, but in which the cam contours are specifically designed for use with automatic clearance regulators; and this constitutes the general object of the present form of invention. However, the present invention may be embodied in a device in which there is provided also a fixed clearance element for use under the circumstances above referred to, and the present invention is accordingly not to be understood as being limited for use in motors that have no ramps on their cam lobes.

A further object is to devise a mechanical clearance regulator which is automatically actuated by the eccentric forces incident to the engagement of the regulator between the driving and driven members, as will be explained.

More specifically, the present object is to devise a mechanical clearance regulator which comprises companion members adapted for automatic longitudinal adjustment through inclined surface engagement therebetween, such adjustment being effected automatically by the eccentric forces incident to the engagement of the regulator between the driving and driven members, as well be explained.

Another object is to devise a mechanical clearance regulator of very simple construction which is capable of automatically increasing its length so as to take up any clearance in the valve linkage, and also capable of automatically decreasing its length during the valve opening period in order to provide momentarily a slight but necessary clearance at the instant when the valve closes, thereby correcting for any expansion and ensuring proper seating of the valve, as above explained.

Other objects will appear from the following description and claims when considered together with the accompanying drawing.

Figure 1:
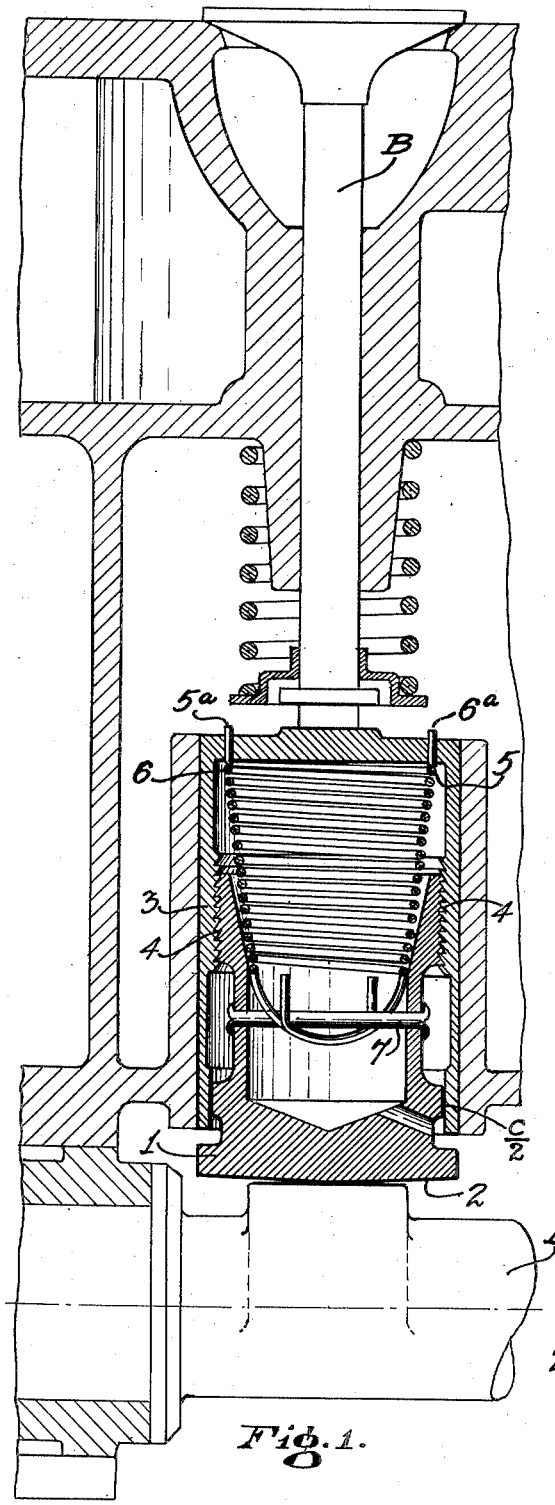
Fig. 1 is a vertical sectional view of my present improved form of device shown in assembly.

It is to be understood that the present form of disclosure is merely for purposes of illustration and that there may be devised various modifications thereof without departing from the spirit of the present invention as herein set forth and claimed.

As indicated upon the accompanying drawing, my device is arranged between a cam shaft A and a valve stem or push rod or some other suitable member B. As will be understood, the cam shaft is the drive member and the valve stem or push rod or the like may be regarded as the driven member during the valve-opening period; whereas the relative arrangement of drive and driven members is practically reversed during the valve-closing period when the valve spring becomes the drive member.

Referring to the device itself, as herein illustrated, the inner member 1 has its mushroom end 2 in contact with the cam lobe of the cam shaft A. The cams in this case do not need and do not have the long ramps above mentioned. The outer member 3 has screw-threaded engagement with its companion member 1 throughout a limited longitudinal extent, as indicated at 4, the buttress thread being here employed although any form of thread may well serve the purpose. Within the members 1 and 3 there is provided a spring means and, for the purpose of even load distribution, two coil springs 5 and 6 are employed in the present device. The upper ends of these springs are anchored at two diametrically opposite points 5a and 6a of the outer member 3, while the other ends thereof are hooked about a transverse bar 7 which is mounted within the inner member 1. These springs not only exert torsional pressure but they also exert axial tension. Their torque normally tends to screw members 1 and 3 apart and their axial tension ensures holding the threaded surfaces together so that no unduly thick oil film may gather between these threads. These springs may also be under compression, as in the companion application, supra, if a freer oil flow or thicker oil film between the threaded surfaces is desired.

During the valve-opening period, the members of the clearance regulator must screw together a controlled micrometric amount. The geometry of this controlled micrometric adjustment is diagrammatically illustrated in Fig. 2 in which certain dimensions are exaggerated for the purpose of a clear understanding. In this figure, the inner member 1 has the mushroom end 2 in contact with the cam lobe of cam shaft A. The outer member 3 has engagement with inner member 1 through the inclined helical surfaces indicated at 4. One of these helical surfaces is shown in this figure as corresponding to an arc of a circle in order to facilitate the understanding thereof.

Figure 2:
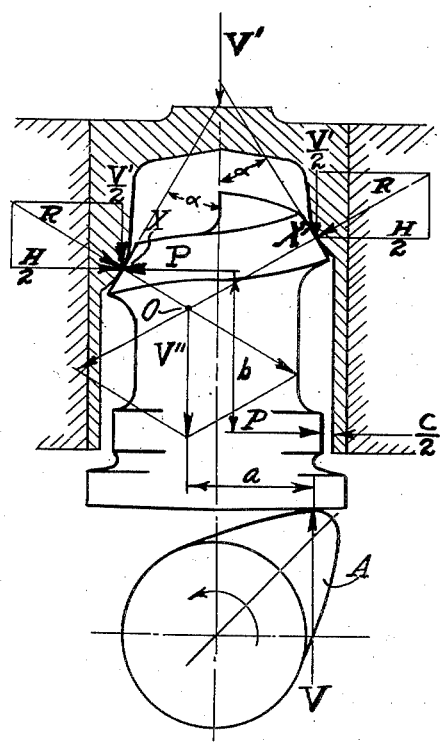
Fig. 2 is a diagrammatic illustration of the forces which actuate the device.

The cam shaft A turns in the direction of the arrow, (counter-clockwise), and exerts upon the face 2 the substantially vertical pressure V. The valve linkage resists with an equal and opposite pressure V'. The pressures V and V' balance each other through pressures V/2 being exerted upon the inclined helical surfaces. In actual clearance regulators, the force V' acts upon and distributes itself over the entire area of one or more inclined helical surfaces. These surfaces will in general have two inclinations, that shown in the drawing and indicated by angle α and that due to the helix angle which is indicated in Fig. 2 in a manner as screw-threads usually are shown. In Fig. 2 we analyze the effect of these forces upon only that inclination due to angle α and find that each force V/2 will set up between the inclined surfaces a force R, each force R being the resultant of the original force V/2 and the incidental component force H/2. Another component due to the helix is very small and is omitted from this analysis of forces. The two resultant forces R intersect each other at the point O and there combine to give magnitude and location to the vertical component V''. It is obvious that forces V and V'' are of equal magnitude but of opposite direction and they are found to act a distance $a$ apart, and therefore they constitute a force couple of moment $Va$, the direction of this force couple being counter-clockwise. It should be noted that the distance $a$ varies as the cam-lift progresses. In Fig. 2, the force couple V'' V of moment $Va$ is not balanced. For convenience of our analysis, we may replace the force couple V'' V by another force couple P' P of moment $Pb$. This is perfectly correct as long as $Va=Pb$.

The inner member 1 is mounted within the outer member 3, there being at the lower portion a clearance C, or C/2 on each side as viewed in Fig. 2. Of course, there is an annular clearance C/2 when the member 1 occupies the normal concentric position with respect to the member 3, as will be readily understood. At the upper portion, member 1 is held normally concentric within member 3 by the contacting inclined helical surfaces, indicated at 4. Under the influence of the force couple of moment $Va$ or its equivalent $Pb$, the member 1 tends to rotate counter-clockwise within member 3 until the clearance C/2 is overcome at the right, as viewed in Fig. 2, and the moment $Pb$ is then exerted and balanced by contact of the lower part of member 1 with the lower part of the wall of the outer member 3. While the clearance C/2 is being overcome, a minute rotation of the inner member 1 occurs about point X as a fulcrum. During this rotative movement, a minute sliding action takes place between the diametrically opposite areas 4. In the present device, the total clearance between member 1 and the lower part of member 3 may be from .001 to .003 of an inch. Obviously this will give a clearance C/2 on each side of from .0005 to .0015 of an inch. It may be observed that the extent of the sliding movement at 4 will be proportional to the distance between fulcrum X and point X'. It will also be proportional to the clearance C/2 but it will be inversely proportional to the location of C/2 from the fulcrum point X. From this proportionality it follows that the rotation of inner member 1 relative to outer member 3 is controllable and, for a given design, it is controlled.

Figure 3:
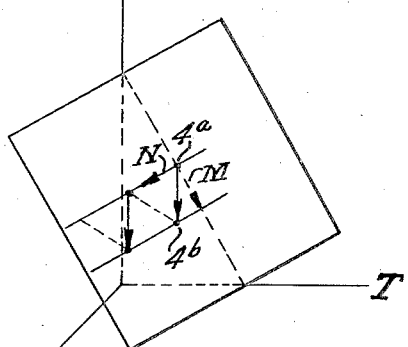
Fig. 3 is an auxiliary diagrammatic illustration.

A small section of the contact area 4 is shown perspectively in Fig. 3. In this form of representation, we can now take account of the inclination due to the helix. The section shown in Fig. 2 is represented in Fig. 3 in the T—Y plane, while the inclination of the contact areas due to the helix is represented in the Z—Y plane. During the enforced and controlled sliding movement at 4, which is incident to the elementary rotary motion discussed above, the contact will tend to travel down both slopes of the contact area,—namely the one shown in the T—Y plane which is due to the cross-section of one contact area, and the other shown in the Z—Y plane which is due to the helix of both contact areas. The sliding down the first slope is represented by component M and the sliding down the second slope is represented by component N. The result of these two component motions is represented by the line 4a—4b. The above occurs while the valve is rising.

During the lowering of the valve, the contact of the cam lobe with head 2 having passed the vertical center line, acts upon the opposite side of the head 2. Consequently, force couple PP' reverses and the sliding movement takes place at contact point X while the rotative movement of member 1 is now about a fulcrum at 4 approximately diametrically opposite the point X. As a result of this combined action, the contact will again slide down both inclinations and this combined relative motion of the contact areas effects a rotative movement about the longitudinal axis of the regulator and thereby effects a slight reduction in the over-all structural length of the clearance regulator members 1 and 3.

It may be here mentioned that force V between the cam lobe and face 2 may not travel across face 2 in a succession of points constituting a straight line but, due to inaccuracies of contact surfaces and mounting conditions, may momentarily transmit itself through a point contact, a line or an area. It may also happen that the sliding of the cam lobe across face 2 may induce a bodily turning motion of the entire clearance regulator, but such turning will have no effect upon the proper functioning of the clearance regulator because the axial tension of springs 5 and 6 is always chosen large enough so that this tension plus the pressures R and P hold the contact surfaces in frictional engagement sufficient to hold members 1 and 3 together and thus these members will rotate together about their common axis. But it will be clear from Fig. 2 that any amount of friction between these contact surfaces can not stop force couple VV' or PP' from causing the clearance regulator to function properly at all times. This observation is now well proved by the successful functioning of a large number of such clearance regulators under grueling conditions.

When the valve has seated, the pressures V and V' disappear and the over-all length of the clearance regulator is less than it was before the valve-lift. If, during the valve-lift, the linkage has expanded a small amount, then the new and shorter structural length of the clearance regulator should still momentarily occasion a minute clearance within the valve linkage. During the interval which elapses before the next valve-lift, the torque of springs 5 and 6 forces members 1 and 3 into distended position until all clearance within the linkage is taken up.

It may be stated here that the helix angle of the contact surfaces or threads is so chosen that when the pressures V and V' are acting concentrically, no relative motion can take place between members 1 and 3.

The contact surfaces are what are commonly known as self-locking. Upon installing the clearance regulator within the valve linkage, it is necessary merely to screw parts 1 and 3 together fully, thereby winding up the springs 5 and 6. While the torque of these wound-up springs constantly tends to unscrew members 1 and 3 into distended position, parts 1 and 3 can always be screwed together sufficiently tight so that the friction between the contact surfaces is greater than the torque of the springs. Parts 1 and 3 will then remain screwed together until after being installed in their proper position within the valve linkage. Then when the cam shaft is turned, the cams will cause eccentric forces to act upon face 2 and these forces, together with slight vibrations, will loosen the frictional lock and consequently the torque of springs 5 and 6 will then cause members 1 and 3 to unscrew until all clearance is taken out of the valve linkage.

If for some reason the valve has been lifted off of its seat some distance in excess of the small amount by which the clearance regulator shortens during each valve-lift, then a large number of valve-lifts may be required before the valve comes to its seat again; but unless the valve sticks tight in its guide, it will always come back to its seat because the large number of small amounts by which the regulator shortens for each cam shaft revolution will soon amount to as much as the valve was held open.

The specific form of device, as herein disclosed, consists of only two members except for the spring means. Thus this form of device is of extremely simple construction and can be manufactured at comparatively low cost. At the same time, this device is positive and dependable in its action, as has been demonstrated by actual use.

As in the companion case, supra, so here also the device is a self-contained structure which can be conveniently handled and easily installed. I have explained with what ease and quickness this device can be originally installed and how it can be depended upon to find its own proper adjustment initially and at all times thereafter. Thus, this device is wholly automatic in its original adjustment as well as at all times during continued operation, with resultant advantages which will be obvious to those who are skilled in the art to which this invention relates.

What I claim is:

1. In an internal combustion engine having a valve operating linkage in which a driven element is operated through eccentric forces received from a driving element, an automatically adjustable clearance regulator having normal operating clearance within its guide, adapted for assembly between the driven and driving elements, including companion members having inclined helical surface engagement with each other for axial relative adjustment and having lateral clearance between them adjacent one end of the regulator which together with said operating clearance will permit action of said eccentric forces upon said members so as to induce said relative axial adjustment therebetween, and resilient means normally tending to adjust the companion members to lengthen the regulator.

2. In an internal combustion engine having a valve operating linkage in which a driven element is operated through eccentric forces received from a driving element, an automatically adjustable clearance regulator having normal operating clearance within its guide, adapted for assembly between the driven and driving elements, including companion members having self-locking loosely threaded engagement with each other for axial relative adjustment and having lateral clearance between them adjacent one end of the regulator which together with said operating clearance will permit action of said eccentric forces upon said members so as to induce said relative axial adjustment therebetween, and resilient means normally tending to adjust the companion members to lengthen the regulator.

3. In an internal combustion engine having a valve operating linkage in which a driven element is operated through eccentric forces received from a driving element, an automatically adjustable clearance regulator having normal operating clearance within its guide, adapted for assembly between the driven and driving elements, including only two companion members having inclined helical surface engagement with each other for axial relative adjustment and having lateral clearance between them adjacent one end of the regulator which together with said operating clearance will permit action of said eccentric forces upon said members so as to induce said relative axial adjustment therebetween, and resilient means normally tending to adust the companion members to lengthen the regulator.

4. In an internal combustion engine having a valve operating linkage in which a driven element is operated through eccentric forces received from a driving element, an automatically adjustable clearance regulator having normal operating clearance within its guide, adapted for assembly between the driven and driving elements, including only two companion members having self-locking loosely threaded engagement with each other for axial relative adjustment and having lateral clearance between them adjacent one end of the regulator which together with said operating clearance will permit action of said eccentric forces upon said members so as to induce said relative axial adjustment therebetween, and resilient means normally tending to adjust the companion members to lengthen the regulator.

5. In an internal combustion engine having a valve operating linkage in which a driven element is operated through eccentric forces received from a driving element, an automatically adjustable clearance regulator having normal operating clearance within its guide, adapted for assembly between the driven and driving elements, including companion members having self-locking loosely threaded engagement with each other to a limited extent axially thereof for axial relative adjustment and having lateral clearance between them adjacent one end of the regulator which together with said operating clearance will permit action of said eccentric forces upon said members so as to induce said relative axial adjustment therebetween, and resilient means normally tending to adjust the companion members to lengthen the regulator.

6. In an internal combustion engine having a valve operating linkage in which a driven element is operated through eccentric forces received from a driving element, an automatically adustable clearance regulator having normal operating clearance within its guide, adapted for assembly between the driven and driving elements, including companion members having inclined helical surface engagement with each other for axial relative adjustment and having lateral clearance between them including lateral clearance between them adjacent one end of the regulator, which together with said operating clearance will permit action of said eccentric forces upon said members so as to induce said relative axial adjustment therebetween, and resilient means normally tending to adjust the companion members to lengthen the regulator.

OTTO M. BURKHARDT.